(12) United States Patent
Morone (10) Patent No.: US 11,680,591 B2
(45) Date of Patent: Jun. 20, 2023

(54) DETERMINING REMAINING LIFE OF A HOSE ASSEMBLY BASED ON SENSOR DATA

(71) Applicant: Caterpillar Inc., Peoria, IL (US)

(72) Inventor: Stefano Morone, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 45 days.

(21) Appl. No.: 17/303,843

(22) Filed: Jun. 9, 2021

(65) Prior Publication Data

US 2022/0397135 A1    Dec. 15, 2022

(51) Int. Cl.

| F15B 20/00 | (2006.01) |
| F15B 19/00 | (2006.01) |
| G01L 5/00 | (2006.01) |

(52) U.S. Cl.
CPC .............. *F15B 20/00* (2013.01); *F15B 19/00* (2013.01); *G01L 5/0061* (2013.01)

(58) Field of Classification Search
CPC ......... F15B 20/00; F15B 19/00; G01L 5/0061
See application file for complete search history.

(56) References Cited

U.S. PATENT DOCUMENTS

| 8,515,687 | B2 | 8/2013 | Pereira et al. |
| 10,309,864 | B1 | 6/2019 | Lee et al. |
| 10,359,774 | B2 * | 7/2019 | Keast ................. G05B 23/0283 |
| 10,677,680 | B1 | 6/2020 | Ortega Gutierrez et al. |
| 2006/0196252 | A1 | 9/2006 | Deckard |
| 2010/0174495 | A1 * | 7/2010 | Pereira ................ G01M 5/0033 |
| | | | 702/34 |
| 2013/0208259 | A1 | 8/2013 | Graham et al. |
| 2013/0247681 | A1 | 9/2013 | Theiss et al. |
| 2016/0237804 | A1 | 8/2016 | Papadimitriou et al. |
| 2018/0074005 | A1 | 3/2018 | Krutz et al. |

FOREIGN PATENT DOCUMENTS

| AU | 2010201152 A1 | 10/2011 |
| JP | 2015010875 A | 1/2015 |
| WO | 2006002454 | 1/2006 |
| WO | 2020255694 A1 | 12/2020 |

OTHER PUBLICATIONS

"Test and Test Procedures for SAE 100R Series Hydraulic Hose and Hose Assemblies," SAE International, Ground Vehicle Standard, J343_200401, Jan. 2004, 9 pages [retrieved from https://saemobilus.sae.org/content/i343_200401].
"Cumulative Damage Analysis for Hydraulic Hose Assemblies," SAE International, Surface Vehicle Standard, J1927_201406, Jun. 2014, 12 pages [retrieved from https://saemobilus.sae.org/content/J1927_201406/].

* cited by examiner

*Primary Examiner* — Bryan Bui (57) ABSTRACT

A system may include a hose assembly and a controller. The hose assembly may comprise a plurality of sensor devices configured to generate sensor data regarding the hose assembly. The sensor data may include at least one of first sensor data regarding a bend radius of a first portion of the hose assembly, or second sensor data regarding an amount of torque at a second portion of the hose assembly. The controller may be configured to receive the sensor data from the plurality of sensor devices; determine a remaining life of the hose assembly based on the sensor data; and perform an action based on the remaining life of the hose assembly.

20 Claims, 3 Drawing Sheets

DETERMINING REMAINING LIFE OF A HOSE ASSEMBLY BASED ON SENSOR DATA

TECHNICAL FIELD

The present disclosure relates generally to a hose assembly and, for example, to determining a remaining life of the hose assembly.

BACKGROUND

A work machine may include one or more hydraulic circuits. A hydraulic circuit may include a valve, a pump, and a plurality of hose assemblies that supply a hydraulic fluid to actuate a hydraulic cylinder assembly. Over a period of time, due to different operations of the work machine, a hose assembly may be subject to different conditions that may negatively affect a remaining life of the hose assembly. Current prediction techniques do not accurately predict the remaining life of the hose assembly. Inaccuracies in predicting the remaining life of the hose assembly may lead to an unexpected failure of the hose assembly, which may cause damage to the hydraulic circuit and/or other components of the work machine. Such damage may cause the work machine to perform in an unintended manner and/or cause the work machine to experience a failure.

U.S. Pat. No. 8,515,687 (the '687 patent) discloses that a hose fault detection system includes a hose assembly including a hose having first and second conductive layers. The hose assembly has an electrical characteristic. A fault detector is in electrical communication with the first and second conductive layers. The fault detector includes an indicator operatively connected to the hose assembly. While the '687 patent discloses a hose fault detection system, the '687 patent focuses on an electrical characteristic of the hose assembly and does not address the different conditions that the hose assembly may be subject to (e.g., during an operation of a work machine).

The system of the present disclosure solves one or more of the problems set forth above and/or other problems in the art.

SUMMARY

A system includes a hose assembly, wherein the hose assembly comprises a plurality of sensor devices configured to generate sensor data regarding the hose assembly, and wherein the sensor data includes at least one of: first sensor data regarding a bend radius of a first portion of the hose assembly, or second sensor data regarding an amount of torque at a second portion of the hose assembly; and a controller configured to: receive the sensor data from the plurality of sensor devices; determine a remaining life of the hose assembly based on the sensor data; and cause an action to be performed based on the remaining life of the hose assembly.

A hose assembly comprising: a coupling interface; a hose; and a plurality of sensor devices configured to: generate sensor data regarding the hose assembly; and provide the sensor data to a controller to cause the controller to determine a remaining life of the hose assembly based on the sensor data, wherein the sensor data includes at least two of: first sensor data regarding a bend radius of a portion of the hose, second sensor data regarding an amount of torque at the coupling interface, third sensor data regarding an amount of elongation of the hose, or fourth sensor data regarding an amount of torsion at the coupling interface, wherein the amount of torsion is based on the amount of torque.

A hose assembly comprising: a first portion associated with at least a first sensor device; and a second portion associated with at least a second sensor device, wherein the first sensor device and the second sensor device are configured to generate sensor data used to determine a remaining life of the hose assembly, and wherein the first sensor device is different than the second sensor device.

DETAILED DESCRIPTION

The present disclosure relates to a system comprising a hose assembly and a controller. The hose assembly may comprise a plurality of sensor devices configured to generate sensor data regarding the hose assembly. The sensor data may include data regarding a bend radius of a first portion of the hose assembly, data regarding an amount of torque at a second portion of the hose assembly, data regarding an amount of elongation of the hose assembly, and data regarding an amount of torsion at the second portion of the hose assembly.

The controller may be configured to determine a remaining life of the hose assembly (e.g., an amount of life remaining for the hose assembly) based on the sensor data. The controller may be configured to determine the remaining life of the hose assembly based on additional sensor data from additional sensor devices included in the system. The additional sensor data may include data regarding a pressure of a fluid transported by the hose assembly and/or data regarding a temperature of the fluid transported by the hose assembly. In this regard, the controller may more accurately determine the remaining life of the hose assembly by taking into consideration information regarding different conditions that may affect a durability of the hose assembly.

The controller may be configured to cause an action to be performed based on the remaining life of the hose assembly. For example, based on determining that the remaining life of the hose assembly does not satisfy the remaining life threshold (e.g., based on determining that the respective hose assembly 220 is approaching a failure), the controller may cause a supply of the fluid, to the hose assembly, to be terminated; may cause a pressure of the fluid to be reduced; and/or may provide a notification (e.g., including information identifying the hose assembly and/or information identifying the hydraulic circuit). The notification may be provided to a device of an operator of the machine, to a device of a technician, among other examples. In this regard, the notification may be provided to cause the hose assembly to be repaired and/or replaced by the operator of the machine, by the technician, among other examples.

The system, of the present disclosure, may more accurately determine the remaining life of the hose assembly and may cause an appropriate action to be performed in a manner that may prevent an unexpected failure of the hose assembly.

The term "machine" may refer to a machine that performs an operation associated with an industry such as, for example, mining, construction, farming, transportation, or another industry. Moreover, one or more implements may be connected to the machine. As an example, a machine may include a construction vehicle, a work vehicle, or a similar vehicle associated with the industries described above.

Figure 1:
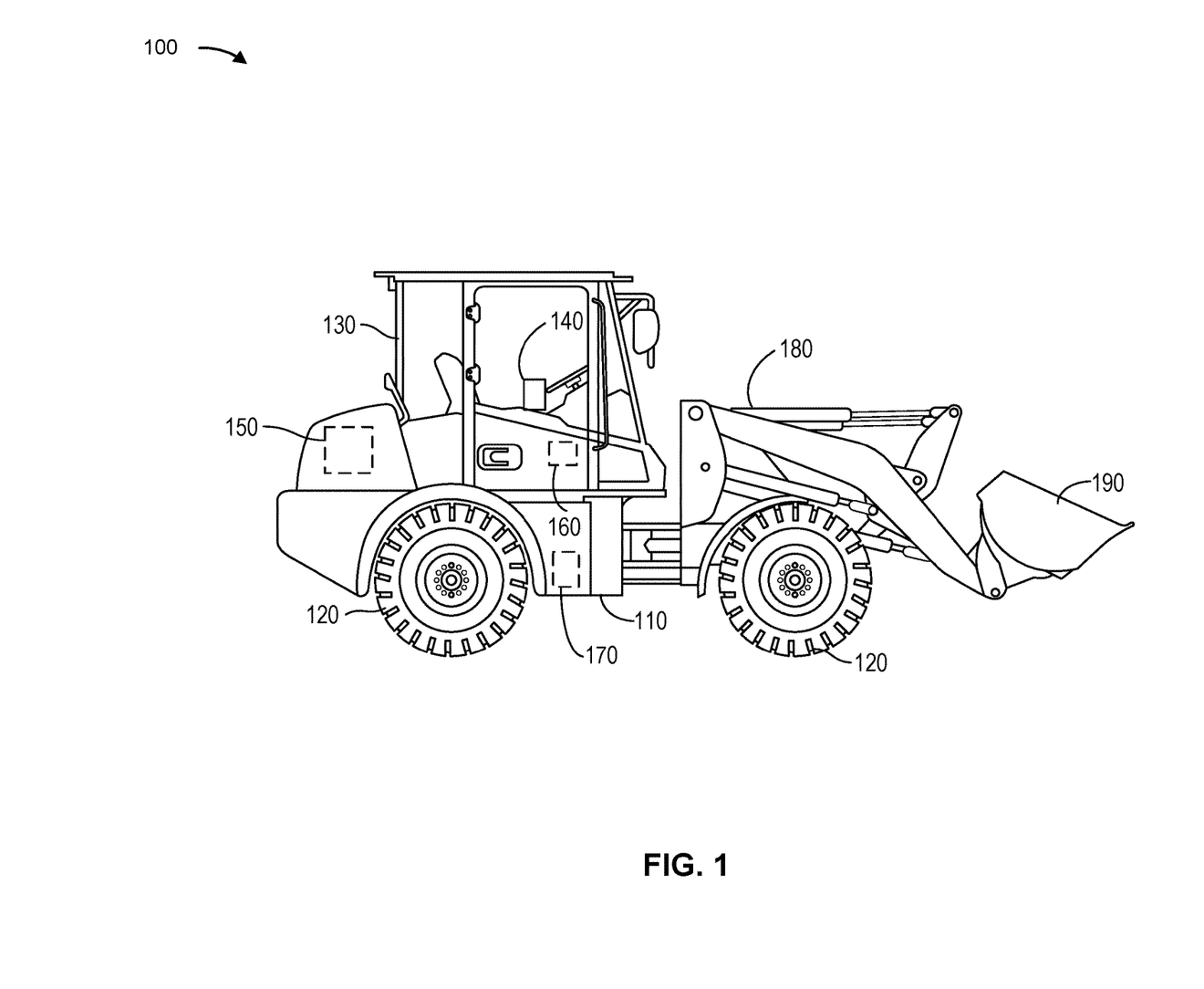
FIG. 1 is a diagram of an example machine described herein.

FIG. 1 is a diagram of an example machine 100 described herein. As shown in FIG. 1, machine 100 may be a wheel loader. Alternatively, machine 100 may be a track type tractor, a motor grader, a dozer, an excavator, among other examples. As shown in FIG. 1, machine 100 includes a frame 110, ground engaging elements 120, an operator cab 130, operator controls 140, an engine 150, a controller 160, a hydraulic circuit 170, hydraulic cylinder assemblies 180, and an implement 190. Ground engaging elements 120 may include wheels, tracks, among other examples, for propelling machine 100. As shown in FIG. 1, ground engaging elements 120 are mounted on frame 110 and driven by engine 150 and one or more drivetrains (not shown).

As shown in FIG. 1, operator cab 130 is mounted on frame 110 and is configured to support an operator of machine 100. Operator cab 130 may include an integrated display (not shown) and operator controls 140, such as, for example, an integrated joystick. Operator controls 140 may include one or more input components and a user interface that enable the operator to control an operation of machine 100. Engine 150 may include a diesel engine, a gasoline engine, a natural gas engine, a hybrid engine, an electric motor, and/or another power source configured to drive ground engaging elements 120.

Controller 160 (e.g., an electronic control module (ECM)) may control and/or monitor operations of machine 100. For example, controller 160 may control and/or monitor the operations of machine 100 based on signals from the integrated display, signals from operator controls 140, and/or signals from hydraulic circuit 170. For instance, controller 160 may determine a remaining life of a hose assembly, of hydraulic circuit 170, and may cause an action to be performed based on the remaining life of the hose assembly, as described in more detail below.

Hydraulic circuit 170 may be mounted to frame 110. Hydraulic circuit 170 may be configured to supply hydraulic fluid to hydraulic cylinder assemblies 180 to cause implement 190 to be articulated (e.g., to cause a movement of implement 190). A hydraulic cylinder assembly 180 may include a hydraulic cylinder and a hydraulic rod. The hydraulic fluid may cause the hydraulic cylinder to be actuated to cause the hydraulic rod to extend out of the hydraulic cylinder and to retract into the hydraulic cylinder, thereby causing implement 190 to be articulated.

As shown in FIG. 1, implement 190 is mounted at a distal end of lifting arms and may be articulated relative to the lifting arms by hydraulic cylinder assemblies 180, electric motors, and/or other electro-mechanical components. Implement 190 may be a bucket (as shown in FIG. 1) or another type of tool or implement that may be mounted the distal end of lifting arms.

As indicated above, FIG. 1 is provided as an example. Other examples may differ from what was described in connection with FIG. 1.

Figure 2:
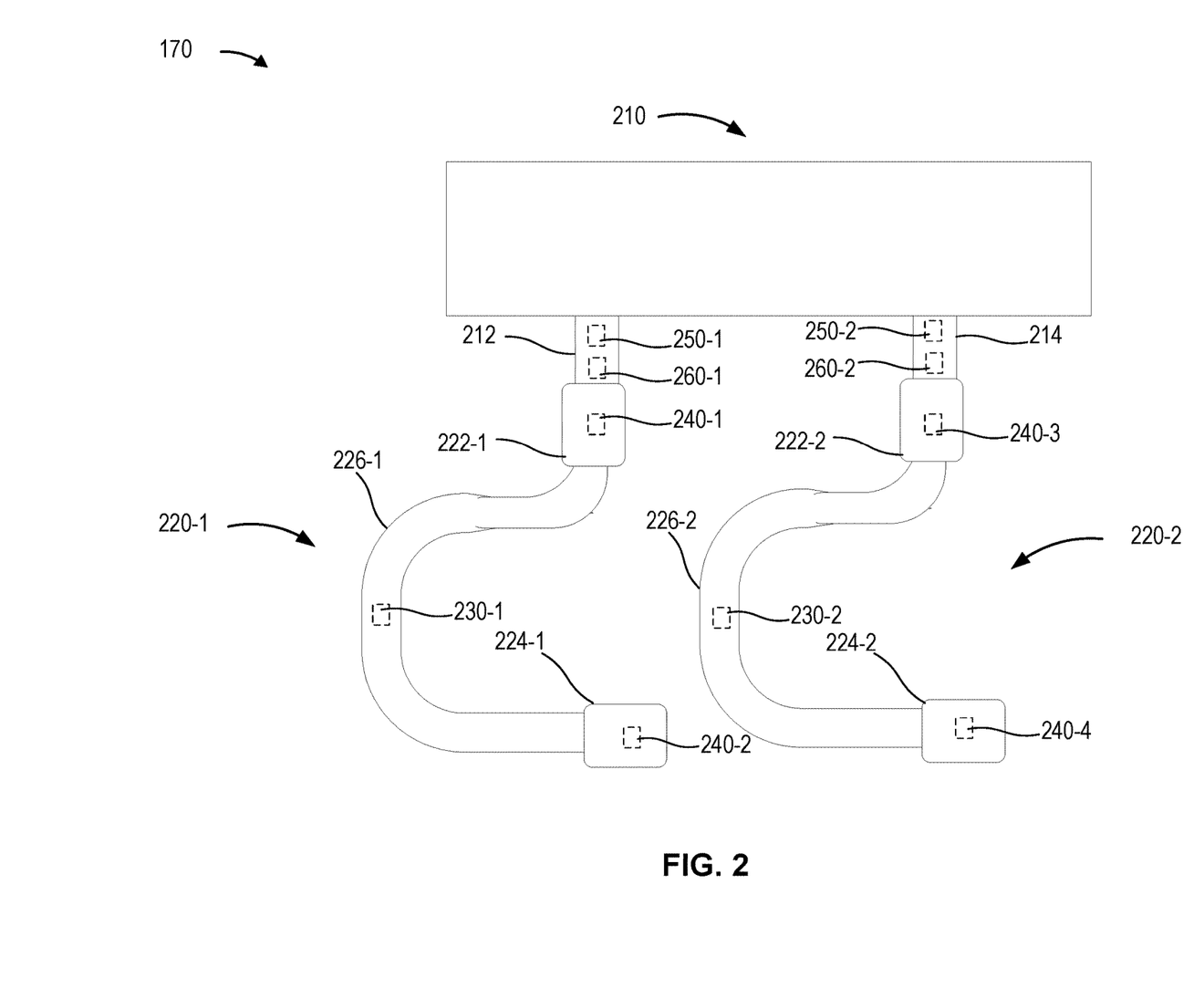
FIG. 2 is a diagram of an example hydraulic circuit described herein.

FIG. 2 is a diagram of an example hydraulic circuit 170 described herein. As shown in FIG. 2, hydraulic circuit 170 includes a valve assembly 210, a plurality of hose assemblies 220 (referred to herein individually as "hose assembly 220," and collectively referred to as "hose assemblies 220"), first sensor devices 230 (referred to herein individually as "first sensor device 230," and collectively referred to as "first sensor devices 230"), second sensor devices 240 (referred to herein individually as "second sensor device 240," and collectively referred to as "second sensor devices 240"), third sensor devices 250 (referred to herein individually as "third sensor device 250," and collectively referred to as "third sensor devices 250"), fourth sensor devices 260 (referred to herein individually as "fourth sensor device 260," and collectively referred to as "fourth sensor devices 260"). In some examples, hydraulic circuit 170 may include a hydraulic pump (not shown) and a hydraulic fluid reservoir (not shown). Hydraulic circuit 170 may be connected to a mounting assembly (not shown) that is configured to be mounted to frame 110 of machine 100.

Valve assembly 210 may include one or more devices that are configured to control a flow of a fluid (e.g., a hydraulic fluid) in hydraulic circuit 170. For example, valve assembly 210 may control an inflow of the hydraulic fluid into hydraulic circuit 170 and control an outflow of the hydraulic fluid out of hydraulic circuit 170. As shown in FIG. 2, valve assembly 210 may include an inlet valve 212 and an outlet valve 214. Inlet valve 212 may be configured to control the inflow of the hydraulic circuit 170. For example, inlet valve 212 may be configured to enable the hydraulic fluid to be provided, via a hose assembly 220 (e.g., hose assembly 220-1), from one or more components (external with respect to hydraulic circuit 170) to hydraulic cylinder assemblies 180. Outlet valve 214 may be configured to control the outflow of the hydraulic fluid out of hydraulic circuit 170. For example, outlet valve 214 may be configured to provide, via another hose assembly 220 (e.g., hose assembly 220-2), the hydraulic fluid from hydraulic cylinder assemblies 180 to the one or more components external with respect to hydraulic circuit 170.

Hose assembly 220 may include a first coupling interface 222, a second coupling interface 224, and a hose 226. First coupling interface 222 may be configured to connect to inlet valve 212. Second coupling interface 224 may be configured to connect to hydraulic cylinder assembly 180 (e.g., via the mounting assembly). Hose 226 may be configured to transport the fluid (e.g., between inlet valve 212 and hydraulic cylinder assembly 180 or between hydraulic cylinder assembly 180 and outlet valve 214). Hose 226 may be a multi-layer hose.

First sensor device 230 may be associated with a respective hose assembly 220. First sensor device 230 may include one or more devices configured to determine a bend radius of a first portion of the respective hose assembly 220 and generate sensor data regarding the bend radius. For example, as shown in FIG. 2, first sensor device 230 may be provided at a portion of hose 226 of the respective hose assembly 220. The portion of hose 226 may correspond to the first portion of the respective hose assembly 220.

The portion of hose 226 may correspond to a portion (or an area) that may be subject to a bend radius violation. The bend radius violation may refer to a bend radius that does not satisfy a bend radius threshold. For example, bending the respective hose assembly 220 (e.g., hose 226) to a bend radius that is less than the bend radius threshold may damage the respective hose assembly 220 (e.g., damage hose 226). Accordingly, the bend radius violation may negatively affect a remaining life of hose assembly 220.

In some examples, first sensor device 230 may include a strain gauge. For instance, first sensor device 230 may include a linear strain gauge. In this regard, in addition to determining the bend radius of the first portion of the respective hose assembly 220, first sensor device 230 may be configured to determine an amount of elongation of the respective hose assembly 220 (e.g., an amount of elongation of hose 226). In some situations, first sensor device 230 may be configured to determine an amount of compression and/or tension at the portion of hose 226. The sensor data, generated by first sensor device 230, may further include information regarding the bend radius of the respective assembly 220, information regarding the amount of elongation of the respective hose assembly 220, information regarding the amount of compression and/or tension, information identifying the respective hose assembly 220, and/or information identifying hydraulic circuit 170.

Second sensor device 240 may include one or more devices configured to determine an amount of torque at a second portion of the respective hose assembly 220 and generate sensor data regarding the amount of torque. The second portion of the respective hose assembly 220 may correspond to first coupling interface 222 (and/or second coupling interface 224). For example, as shown in FIG. 2, second sensor device 240 may be provided adjacent to first coupling interface 222 (and/or adjacent to second coupling interface 224).

In some examples, second sensor device 240 may include a strain gauge. For instance, second sensor device 240 may include a shear strain gauge. In this regard, in addition to determining the amount of torque, second sensor device 240 may be configured to determine an amount of torsion at the second portion of hose assembly 220. In some situations, the amount of torsion may be based on the amount of torque. The sensor data, generated by second sensor device 240, may further include information regarding the amount of torsion, information identifying the respective hose assembly 220, and/or information identifying hydraulic circuit 170.

The locations of first sensor devices 230 and second sensor devices 240 are merely provided as examples. In practice, first sensor devices 230 and second sensor devices 240 may be provided at different portions of hose assembly 220.

Third sensor device 250 may include one or more devices configured to determine a temperature of the fluid transported by the respective hose assembly 220 and generate sensor data regarding the temperature of the fluid. As shown in FIG. 2, third sensor device 250 may be provided adjacent to inlet valve 212 (e.g., may be located inside inlet valve 212) and/or provided adjacent to outlet valve 214 (e.g., may be located inside outlet valve 214).

In some examples, third sensor device 250 may include a temperature sensor device. The sensor data, generated by third sensor device 250, may further include information regarding a location of third sensor device 250 (e.g., information identifying inlet valve 212), information identifying the respective hose assembly 220, information identifying hydraulic circuit 170 and/or other components (of machine 100) that are associated hydraulic circuit 170, among other examples.

Fourth sensor device 260 may include one or more devices configured to determine a pressure of the fluid transported by the respective hose assembly 220 and generate sensor data regarding the pressure of the fluid. As shown in FIG. 2, fourth sensor device 260 may be provided adjacent to inlet valve 212 (e.g., may be located inside inlet valve 212) and/or provided adjacent to outlet valve 214 (e.g., may be located inside outlet valve 214). In some situations, the pressure of the fluid may correspond to a working pressure of the fluid.

In some examples, fourth sensor device 260 may include a pressure sensor device (e.g., a fluid pressure sensor device). The sensor data, generated by fourth sensor device 260, may further include information regarding a location of fourth sensor device 260 (e.g., information identifying inlet valve 212), information identifying the respective hose assembly 220, information identifying hydraulic circuit 170 and/or other components (of machine 100) that are associated hydraulic circuit 170, among other examples. The sensor data, generated by fourth sensor device 260, may be used (e.g., by controller 160) to identify pressure peaks (e.g., pressure spikes) and determine a correlation between the pressure peaks and the elongation, the torque, and/or the torsion discussed above in connection with the respective hose assembly 220.

The locations of third sensor devices 250 and fourth sensor devices 260 are merely provided as examples. In practice, third sensor devices 250 and fourth sensor devices 260 may be provided at different portions of hydraulic circuit 170 and/or hose assembly 220.

In some implementations, hydraulic circuit 170 may include one or more additional sensor devices associated with the respective assembly 220. For example, hydraulic circuit 170 may include a first additional sensor device to determine ambient temperature and generate sensor data regarding the ambient temperature. Additionally, or alternatively, hydraulic circuit 170 may include a second additional sensor device to determine an amount of vibration at one or more portions of the respective hose assembly 220 (e.g., at first coupling interface 222, at second coupling interface 224, at one or more portions of hose 226, among other examples). The second additional sensor device may generate sensor data regarding the amount of vibration.

The sensor devices discussed above (e.g., first sensor devices 230, second sensor devices 240, third sensor devices 250, fourth sensor devices 260, and/or the additional sensor devices) may be referred to herein individually as "hose sensor device," and collectively referred to as "hose sensor devices." In some examples, the hydraulic sensor devices may provide the sensor data to controller 160 to enable controller 160 to determine the remaining life of the respective hose assembly 220. The hose sensor devices may provide the sensor data to controller 160 periodically (e.g., every five seconds, every ten seconds, every thirty seconds, among other examples). Additionally, or alternatively, the hose sensor devices may provide the sensor data to controller 160 based on a trigger (e.g., based on a request from controller 160, based on the remaining life of the respective hose assembly 220, among other examples).

In some implementations, controller 160 may cause the hose sensor devices to adjust a rate at which the hose sensor devices provide the sensor data to controller 160 based on the remaining life of the respective hose assembly 220. For example, controller 160 may cause the hose sensor devices to increase a rate at which the hose sensor devices provide the sensor data when controller 160 determines that the remaining life of the respective hose assembly 220 does not satisfy a remaining life threshold (e.g., determines that the respective hose assembly 220 is approaching a failure). Alternatively, controller 160 may cause the hose sensor devices to decrease a rate at which the hose sensor devices provide the sensor data when controller 160 determines that the remaining life of the respective hose assembly 220 satisfies the remaining life threshold.

In some examples, controller 160 may determine the remaining life of the respective hose assembly 220 as a portion of a standard expected life of the respective hose assembly 220. Controller 160 may be pre-configured with information regarding the standard expected life of the respective hose assembly 220. Additionally, or alternatively, controller 160 may receive the information regarding the standard expected life of the respective hose assembly 220 from operator controls 140, from a device of the operator, from a back office system, among other examples.

When determining the remaining life of the respective hose assembly, controller 160 may determine wear factors based on the sensor data. For example, controller 160 may determine a first wear factor based on the bend radius (or based on the bend radius violation associated with the bend radius), a second wear factor based on the amount of torque, a third wear factor based on the temperature of the fluid, a fourth wear factor based on the pressure of the fluid, and so on.

A wear factor may refer to an amount of wear of the respective hose assembly 220 (e.g., an amount of wear as a result of the bend radius violation, an amount of wear as a result of the amount of torque, an amount of wear as a result of the temperature of the fluid, an amount of wear as a result of the amount of pressure, and so on). In this regard, controller 160 may initially reduce the standard expected life of the respective hose assembly 220 by the wear factor to determine the remaining life of the respective hose assembly 220 (e.g., when the respective hose assembly 220 is a brand new hose assembly). Subsequently, controller 160 may reduce a current remaining life of the respective hose assembly 220 by the wear factor.

The first wear factor may be based on a value of the bend radius (identified by the sensor data generated by first sensor device 230). For example, for a first value of the bend radius, the first wear factor may be a first portion (or a first percentage) of a bend radius wear. The bend radius wear may refer to an amount of wear, of the respective hose assembly 220, corresponding to the bend radius threshold (e.g., an amount of wear when the bend radius violation has not occurred). For a second value of the bend radius, the first wear factor may be a second portion (or a second percentage) of the bend radius wear.

Assume the first value and the second value satisfy the bend radius threshold. In this regard, for the first value, the first wear factor may be ten times the bend radius wear. For the second value, the first wear factor may be fifty times the bend radius wear. Assume that the standard expected life of the respective hose assembly 220 is measured in cycles (e.g., cycles of usage of the respective hose assembly 220), that each cycle is determined based on a spike of the pressure of the fluid, and that the bend radius wear is one cycle. In this regard, the first wear factor may be ten cycles for the first value; may be fifty cycles for the second value; and may be one cycle for a third value that does not satisfy the bend radius threshold.

The second wear factor may be based on a value of the amount of torque (identified by the sensor data generated by second sensor device 240). For example, for a first value of the amount of torque, the second wear factor may be a first portion (or a first percentage) of a torque wear. The torque wear may refer to an amount of wear, of the respective hose assembly 220, when the amount of torque does not satisfy a torque threshold (the torque threshold being a normal or acceptable amount of torque). For a second value of the amount of torque, the second wear factor may be a second portion (or a second percentage) of the torque wear.

The third wear factor may be based on a value of the temperature of the fluid (identified by the sensor data generated by third sensor device 250). For example, for a first value of the temperature, the third wear factor may be a first portion (or a first percentage) of a temperature wear. The temperature wear may refer to an amount of wear, of the respective hose assembly 220, corresponding to a range of temperatures of the fluid. The range of temperatures may correspond to normal (or acceptable) temperatures for the fluid. For a second value of the temperature, the third wear factor may be a second portion (or a second percentage) of the temperature wear. In some instances, a first temperature (that exceeds a second temperature) may cause more wear than the second temperature.

In some implementations, the fourth wear factor may be based on a value of the pressure of the fluid (identified by the sensor data generated by fourth sensor device 260). For example, for a first value of the pressure of the fluid, the fourth wear factor may be a first portion (or a first percentage) of a pressure wear. The pressure wear may refer to an amount of wear, of the respective hose assembly 220, corresponding to a pressure threshold (e.g., an amount of wear when the pressure of the fluid does not satisfy the pressure threshold). For a second value of the pressure of the fluid, the fourth wear factor may be a second portion (or a second percentage) of the pressure wear. Assume the first value and the second value satisfy the pressure threshold. In this regard, for the first value, the fourth wear factor may be ten times the pressure wear. For the second value, the fourth wear factor may be sixty times the pressure wear.

Controller 160 may be configured to determine the remaining life of the respective hose assembly each time the bend radius violation occurs (e.g., based on the first wear factor), each time the amount of torque satisfies the torque threshold (e.g., based on the second wear factor), each time the temperature of the fluid falls outside the range of temperatures (e.g., based on the third wear factor), each time the pressure of the fluid satisfies the pressure threshold (e.g., based on the fourth wear factor), and so on.

For example, each time the bend radius violation occurs, controller 160 may be configured to determine the remaining life of the respective hose assembly 220 by reducing a current remaining life of the respective hose assembly 220 based on the first wear factor. For instance, controller 160 may subtract the first wear factor from the current remaining life. Initially (e.g., when the respective hose assembly 220 is a brand new hose assembly), the current remaining life may be the standard expected life of the respective hose assembly 220.

With respect to the bend radius violation, assume that the current remaining life of the respective hose assembly 220 is 600,000 cycles and that the first wear factor (e.g., for the bend radius identified by the sensor data) is 100 cycles. In this regard, controller 160 may reduce the 600,000 cycles by 100 cycles to determine that the remaining life is 599,900 cycles. Controller 160 may use different mathematical operations or a combination of mathematical operations to determine the remaining life based on the first wear factor and the current remaining life of the respective hose assembly 220. Controller 160 may perform similar actions based on the second wear factor, the third wear factor, and so on.

Other wear factors (e.g., based on the elongation of the respective hose assembly 220, based on the amount of torsion of the respective hose assembly 220, among other examples) may be determined in a manner similar to the manner described in connection with the first wear factor, the second wear factor, and so on. In some examples, a wear factor may be based on a type of the respective hose assembly 220 and/or a dimension of the respective hose assembly 220. For example, the first wear factor for the respective hose assembly 220 of a first type and/or a first dimension may be different than the first wear factor for the respective hose assembly 220 of a second type and/or a second dimension.

The values discussed above, in connection with the wear factors and the current remaining life, are merely provided as example. In practice, different values may be used for different situations. Controller 160 may be pre-configured with information regarding the thresholds and/or regarding the temperature ranges discussed herein. Additionally, or alternatively, controller 160 may receive the information regarding the thresholds and/or regarding the temperature ranges from operator controls 140, from a device of the operator, from a back office system, among other examples. In some situations, controller 160 may use the sensor data to track a number of times the bend radius violation occurs and to determine an amount of pressure associated with the bend radius violation. Similarly, controller 160 may use the sensor data to track a number of times the respective hose assembly 220 was subject to an amount of pressure, of the fluid, that resulted in an amount of torque that satisfies the torque threshold.

In some instances, controller 160 may use a data structure to determine the wear factors. For example, controller 160 may search the data structure, using the sensor data, to identify the wear factors corresponding to the sensor data. For example, controller 160 may search the data structure, using the bend radius (identified in the sensor data), to identify the first wear factor corresponding to the bend radius; search the data structure, using the amount of torque (identified in the sensor data), to identify the second wear factor corresponding to the amount of torque; and so on. The data structure (e.g., a database, a linked list, a table, and/or the like) may store information identifying the different wear factors (discussed above) in association with information identifying corresponding bend radius, corresponding amounts of torque, corresponding temperatures of the fluid, corresponding pressures of the fluid, corresponding types and/or dimensions of the respective hose assembly 220, and so on.

For example, the data structure may store a first value of the first wear factor in association of information identifying a corresponding first bend radius and/or a corresponding first type and/or first dimension of the respective hose assembly 220; a second value of the first wear factor in association of information identifying a corresponding second bend radius and/or a corresponding second type and/or second dimension of the respective hose assembly 220; a first value of the second wear factors in association of information identifying a corresponding amount of torque and/or a corresponding type and/or dimension of the respective hose assembly 220; and so on.

In some situations, the information stored in the data structure may be obtained based on a simulation model that simulates operations of the respective hose assembly 220. For example, the simulation model may simulate different events (e.g., different bend radius, different amounts of torque, different temperatures of the fluid, different pressures of the fluid, and so on). The simulation model may determine an amount of wear for the respective hose assembly 220 following each event. Additionally, or alternatively, the information stored in the data structure may be obtained based on manual measurements of wear of the respective hose assembly 220 following each event discussed above.

Additionally or alternatively to using the data structure, controller 160 may use a machine learning model to determine the wear factors. For example, controller 160 may provide, as input to the machine learning model, the sensor data (e.g., identifying the bend radius, the amount of torque, the temperature of the fluid, the pressure of the fluid, and so on). The machine learning model may determine (or predict) the wear factors corresponding to the sensor data. For example, the machine learning model may determine the first wear factor corresponding to the bend radius, the second wear factor corresponding to the amount of torque, and so on.

In some situations, controller 160 may provide, as input to the machine learning model, information identifying a current remaining life of the respective hose assembly 220. The machine learning model may determine the remaining life of the respective hose assembly 220 based on the wear factors and the current remaining life of the respective hose assembly 220. For example, the machine learning model may determine the wear factors. Alternatively, controller 160 may determine the wear factors and may provide the wear factors and the information identifying the current remaining life of the respective hose assembly 220 as input to the machine learning model. The machine learning model may determine the remaining life based on the wear factors and the current remaining life, in a manner similar to the manner described above.

Controller 160 may train the machine learning model using historical data associated with the respective hose assembly 220, associated with one or more other hose assemblies similar to the respective hose assembly 220, among other examples. The one or more other hose assemblies may be a similar type, may have similar dimension with respect the type and/or dimension of the respective hose assembly 220. The historical data may include historical data regarding bend radius, historical amounts of torque, historical temperatures of fluid, historical pressures of fluid, historical wear factors, historical data regarding current remaining life, among other examples.

When training the machine learning model, controller 160 may portion the historical data into a training set (e.g., a set of data to train the model), a validation set (e.g., a set of data used to evaluate a fit of the model and/or to fine tune the model), a test set (e.g., a set of data used to evaluate a final fit of the model), and/or the like. Controller 160 may preprocess and/or perform dimensionality reduction to reduce the historical data to a minimum feature set. Controller 160 may train the model on this minimum feature set, thereby reducing processing to train the machine learning model, and may apply a classification technique, to the minimum feature set.

Controller 160 may use a classification technique, such as a logistic regression classification technique, a random forest classification technique, a gradient boosting machine learning (GBM) technique, and/or the like, to determine a categorical outcome (e.g., a wear factor, a remaining life, among other examples). In addition to, or as an alternative to use the classification technique, controller 160 may use a naïve Bayesian classifier technique. In this case, controller 160 may perform binary recursive partitioning to split the historical data of the minimum feature set into partitions and/or branches and use the partitions and/or branches to perform predictions (e.g., a wear factor, a remaining life, among other examples). Based on using recursive partitioning, controller 160 may reduce utilization of computing resources relative to manual, linear sorting and analysis of data items, thereby enabling use of thousands, millions, or billions of data items to train a model, which may result in a more accurate model than using fewer data items.

Controller 160 may train the model using a supervised training procedure that includes receiving input to the model from a subject matter expert (e.g., one or more operators associated with machine 100 and/or one or more other machines), which may reduce an amount of time, an amount of processing resources, and/or the like to train the model relative to an unsupervised training procedure. Controller 160 may use one or more other model training techniques, such as a neural network technique, a latent semantic indexing technique, and/or the like.

For example, controller 160 may perform an artificial neural network processing technique (e.g., using a two-layer feedforward neural network architecture, a three-layer feedforward neural network architecture, and/or the like) to perform pattern recognition with regard to patterns of different wear factors. In this case, using the artificial neural network processing technique may improve an accuracy of the model generated by controller 160 by being more robust to noisy, imprecise, or incomplete data, and by enabling controller 160 to detect patterns and/or trends undetectable to human analysts or systems using less complex techniques.

After training, the machine learning model may be used to determine (or predict) different wear factors for the respective hose assembly 220 and/or a remaining life of the respective hose assembly 220, as explained above. In some situations, the output of the machine learning model may include a score for the wear factors and/or the remaining life.

The score may represent a measure of confidence of the wear factors and/or the remaining life determined by the machine learning model. In this regard, controller 160 may use the wear factors and/or the remaining life predicted by the machine learning model when the measure of confidence of the wear factors and/or the remaining life satisfy a confidence threshold. In some instances, controller 160 may use the wear factors predicted by the machine learning model if controller 160 is unable to identify, in the data structure, wear factors corresponding to the sensor data.

A different device, such as a server device, may generate and train the machine learning model. The different device may provide the machine learning model for use by controller 160. The different device may update and provide (e.g., on a scheduled basis, on an on-demand basis, on a triggered basis, on a periodic basis, and/or the like) the machine learning model to controller 160. Controller 160 may update the machine learning model.

Controller 160 may cause an action to be performed based on the remaining life of the respective hose assembly 220. For example, controller 160 may determine whether the remaining life of the respective hose assembly 220 satisfies a remaining life threshold. If controller 160 determines that the remaining life of the respective hose assembly 220 satisfies the remaining life threshold (e.g., the respective hose assembly 220 has a sufficient or acceptable amount life remaining), controller 160 may provide a notification (e.g., to a device of the operator, to a back office system, to a device of a technician, to an autonomous device, among other examples). The notification may include information identifying the respective hose assembly 220, information identifying hydraulic circuit 170, information identifying the remaining life of the respective hose assembly 220, information identifying a location of machine 100 (e.g., for use by the device of the technician and/or to the autonomous device), among other examples.

If controller 160 determines that the remaining life of the respective hose assembly 220 does not satisfy the remaining life threshold (e.g., the respective hose assembly 220 has been worn to the point of approaching a failure), controller 160 may perform one or more actions. For example, controller 160 may provide the notification discussed above. The notification may be provided to cause the respective hose assembly 220 to be repaired and/or replaced by the operator of machine 100, by the technician, by the autonomous device, among other examples.

With respect to the technician for example, controller 160 may provide the notification to cause the technician to be dispatched to the location of machine 100 to service, repair, and/or replace the respective hose assembly 220. With respect to the autonomous device for example, controller 160 may provide the notification to cause the autonomous device to navigate to the location of machine 100, to service, repair, and/or replace the respective hose assembly 220.

Additionally, or alternatively, to providing the notification, controller 160 may cause a supply of the hydraulic fluid, to hydraulic circuit 170, to be terminated; may cause a pressure of the hydraulic fluid to be reduced; may cause machine 100 to suspend or terminate a current operation of machine 100; may cause machine 100 to be immobilized; may cause components of machine 100 associated with hydraulic circuit 170 (e.g., implement 190) to be immobilized; among other examples.

In some instances, controller 160 may predict when the respective hose assembly 220 will experience a failure based on the remaining life. In such instances, controller 160 may determine a particular time to replace the respective hose assembly 220 based on when the respective hose assembly 220 is predicted to experience a failure. If controller 160 predicts that the failure is imminent, controller 160 may perform one or more of the actions described above. If controller 160 predicts that the failure is not imminent, controller 160 may not perform an action. In some situations, controller 160 may predict that the failure is imminent based on the amount of torque. For example, controller 160 may determine the remaining life of the respective hose assembly 220 based on a value of the second wear factor (corresponding to the amount of torque) and the current remaining life, in a manner similar to the manner described above. Similarly, controller 160 may predict that the failure is imminent when the amount of elongation, of the respective hose assembly, satisfies an elongation threshold.

While the foregoing example has been described in connection with hose assembly 220 of hydraulic circuit 170, the present disclosure is applicable to a hose assembly used in other applications such as a fuel line hose, an engine oil hose, an engine coolant hose, an air hose, among other examples (e.g., other than a hose assembly used in a hydraulic circuit).

The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of hydraulic circuit 170 may perform one or more functions described as being performed by another set of devices of hydraulic circuit 170.

Figure 3:
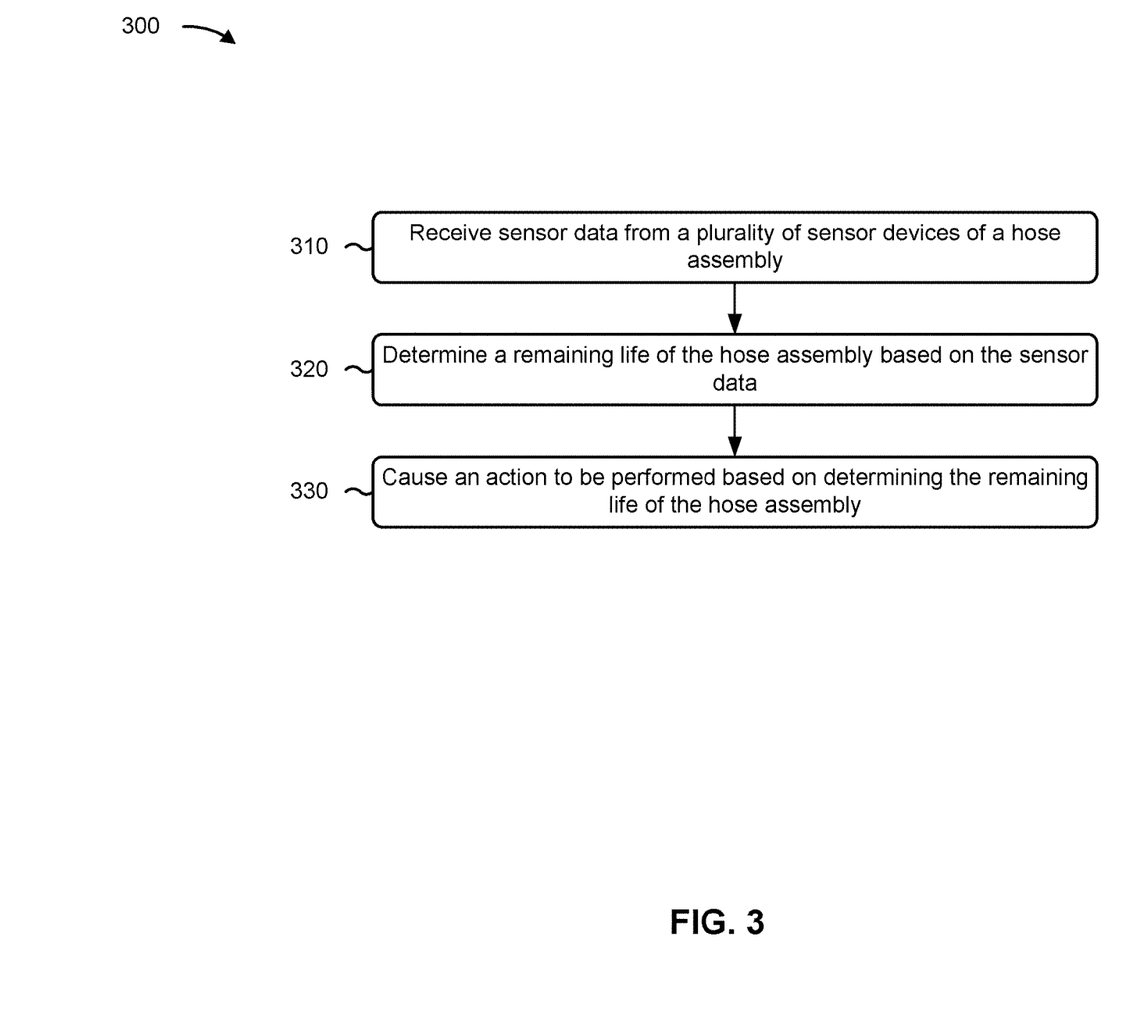
FIG. 3 is a flowchart of an example processes relating to determining a remaining life of a hose assembly.

FIG. 3 is a flowchart of an example process 300 associated with determining remaining life of a hose assembly based on sensor data. In some implementations, one or more process blocks of FIG. 3 may be performed by a controller (e.g., controller 160). In some implementations, one or more process blocks of FIG. 3 may be performed by another device or a group of devices separate from or including the controller, such as first sensor device (e.g., first sensor device 230), second sensor device (e.g., second sensor device 240), third sensor device (e.g., third sensor device 250) and/or fourth sensor device (e.g., fourth sensor device 260).

As shown in FIG. 3, process 300 may include receiving sensor data from a plurality of sensor devices of a hose assembly (block 310). For example, the controller may receive sensor data from a plurality of sensor devices of a hose assembly, as described above.

As further shown in FIG. 3, process 300 may include determining a remaining life of the hose assembly based on the sensor data (block 320). For example, the controller may determine a remaining life of the hose assembly based on the sensor data, as described above.

As further shown in FIG. 3, process 300 may include causing an action to be performed based on the remaining life of the hose assembly (block 330). For example, the controller may cause an action to be performed based on the remaining life of the hose assembly, as described above.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The present disclosure relates to a system comprising a hose assembly and a controller. The hose assembly may comprise a plurality of sensor devices configured to generate sensor data regarding the hose assembly. The sensor data may include data regarding a bend radius of a first portion of the hose assembly, data regarding an amount of torque at a second portion of the hose assembly, data regarding an amount of elongation of the hose assembly, and/or data regarding an amount of torsion at the second portion of the hose assembly.

The controller may be configured to determine a remaining life of the hose assembly (e.g., an amount of life remaining for the hose assembly) based on the sensor data. The controller may be configured to determine the remaining life of the hose assembly based additional sensor data from additional sensor devices included in the system. The additional sensor data include data regarding a pressure of a fluid transported by the hose assembly and data regarding a temperature of the fluid transported by the hose assembly. In this regard, the controller may be configured to more accurately determine the remaining life of the hose assembly.

Inaccuracies in predicting the remaining life of the hose assembly may lead to an unexpected failure of the hose assembly, which may cause damage to the hydraulic circuit and/or other components of a machine. By accurately determining the remaining life of the hose assembly, the controller, of the present disclosure, may prevent the unexpected failure (and sometimes catastrophic failure) of the hose assembly.

The controller may be configured to cause an action to be performed based on the remaining life of the hose assembly. For example, based on determining that the remaining life of the hose assembly does not satisfy a remaining life threshold, the controller may cause a supply of a hydraulic fluid, to the hose assembly, to be terminated; cause a pressure of the hydraulic fluid to be reduced; and/or provide a notification (e.g., including information identifying the hose and/or information identifying the hydraulic circuit). The notification may be provided to a device of an operator of the machine, to a device of a technician, among other examples.

In this regard, the notification may be provided to cause the hose assembly to be repaired and/or replaced by the operator of the machine, by the technician, among other examples.

The system, of the present disclosure, may more accurately determine the remaining life of the hose assembly and may cause an appropriate action to be performed in a manner that may prevent an unexpected failure of the hose assembly.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A system, comprising:
   a hose assembly,
      wherein the hose assembly comprises a plurality of sensor devices configured to generate sensor data regarding the hose assembly, and
      wherein the sensor data includes at least one of:
         first sensor data regarding a bend radius of a first portion of the hose assembly, or
         second sensor data regarding an amount of torque at a second portion of the hose assembly; and
   a controller configured to:
      receive the sensor data from the plurality of sensor devices;
      determine one or more wear factors based on the at least one of the first sensor data or the second sensor data,
         wherein the one or more wear factors include one or more of a first wear factor based on the bend radius or a second wear factor based on the amount of torque;

determine a remaining life of the hose assembly based on the one or more wear factors;
determine whether the remaining life of the hose assembly satisfies a remaining life threshold; and
cause an action to be performed based on determining whether the remaining life of the hose assembly satisfies the remaining life threshold.

2. The system of claim 1, wherein the sensor data further includes at least one of:
third sensor data regarding an amount of elongation of the hose assembly, or
fourth sensor data regarding an amount of torsion at the second portion of the hose assembly,
wherein the amount of torsion is based on the amount of torque, and
wherein the one or more wear factors further include one or more of a third wear factor based on the amount of elongation or a fourth wear factor based on the amount of torsion.

3. The system of claim 1, wherein the plurality of sensor devices includes a first sensor device and a second sensor device,
wherein the system further comprises:
a third sensor device configured to generate third sensor data regarding a temperature of a fluid transported by the hose assembly; and
wherein the one or more wear factors further include a third wear factor based on the temperature of the fluid transported by the hose assembly.

4. The system of claim 1, wherein the plurality of sensor devices includes a first sensor device and a second sensor device,
wherein the system further comprises:
a third sensor device configured to generate third sensor data regarding a pressure of a fluid transported by the hose assembly; and
wherein the one or more wear factors further include a third wear factor based on the pressure of the fluid transported by the hose assembly.

5. The system of claim 1, wherein, to cause the action to be performed, the controller is configured to:
selectively perform a first action or a second action,
wherein the first action is performed when the remaining life of the hose assembly satisfies the remaining life threshold, and
wherein the second action is performed when the remaining life of the hose assembly does not satisfy the remaining life threshold.

6. The system of claim 5, wherein, to cause the first action to be performed, the controller is configured to provide at least one of:
information identifying the hose assembly; or
information identifying the remaining life of the hose assembly.

7. The system of claim 5, wherein, to cause the second action to be performed, the controller is configured to provide at least one of:
cause a supply of a hydraulic fluid, to the hose assembly, to be terminated; or
cause a pressure of the hydraulic fluid to be reduced.

8. The system of claim 1, wherein, to cause the action to be performed, the controller is configured to:
perform the action to cause the hose assembly to be repaired or to be replaced.

9. A hose assembly comprising:
a coupling interface;
a hose; and
a plurality of sensor devices configured to:
generate sensor data regarding the hose assembly; and
provide the sensor data to a controller to cause the controller to determine a remaining life of the hose assembly based on the sensor data and cause an action to be performed based on whether the remaining life satisfies a remaining life threshold,
wherein the remaining life is determined based on wear factors that are determined based on the sensor data,
wherein the sensor data includes at least two of:
first sensor data regarding a bend radius of a portion of the hose,
second sensor data regarding an amount of torque at the coupling interface,
third sensor data regarding an amount of elongation of the hose, or
fourth sensor data regarding an amount of torsion at the coupling interface,
wherein the amount of torsion is based on the amount of torque.

10. The hose assembly of claim 9, wherein the sensor data includes at least three of:
the first sensor data,
the second sensor data,
the third sensor data, and
the fourth sensor data.

11. The hose assembly of claim 9, wherein the plurality of sensor devices include a plurality of strain gauges.

12. The hose assembly of claim 9, wherein the plurality of sensor devices include a strain gauge of a first type and a strain gauge of a second type different than the first type,
wherein the strain gauge of the first type is configured to generate the first sensor data, and
wherein the strain gauge of the second type is configured to generate the second sensor data.

13. The hose assembly of claim 9, wherein the plurality of sensor devices include a first sensor device provided at the portion of the hose and a second sensor device provided at the coupling interface.

14. The hose assembly of claim 13, wherein the first sensor device is configured to generate the first sensor data, and
wherein the second sensor device is configured to generate the second sensor data.

15. A hose assembly comprising:
a first portion associated with at least a first sensor device; and
a second portion associated with at least a second sensor device,
wherein the first sensor device and the second device are configured to generate sensor data used to determine a remaining life of the hose assembly,
wherein the remaining life is determined based on wear factors that are determined based on the sensor data,
Wherein the sensor data includes first sensor data regarding a bend radius of the first portion of the hose assembly and second sensor data regarding an amount of torque at the second portion of the hose assembly,
Wherein the sensor data is provided to cause an action to be performed based on whether the remaining life satisfies a remaining life threshold, and wherein the first sensor device is different than the second sensor device.

16. The hose assembly of claim 15, wherein the sensor data further includes:

third sensor data regarding an amount of elongation of the hose assembly, and fourth sensor data regarding an amount of torsion at the second portion of the hose assembly.

17. The hose assembly of claim 15, wherein the hose assembly further includes a hose, and wherein the first sensor device is provided at a portion of the hose.

18. The hose assembly of claim 15, wherein the hose assembly further includes a coupling interface, and wherein the second sensor device is provided at the coupling interface.

19. The hose assembly of claim 15, wherein the first sensor device and the second sensor device include a plurality of strain gauges.

20. The hose assembly of claim 19, wherein the plurality of strain gauges include a first strain gauge of a first type and a second strain gauge of a second type different than the first type, wherein the first strain gauge of the first type is configured to generate the first sensor data, and wherein the second strain gauge of the second type is configured to generate the second sensor data.

* * * * *